(12) United States Patent
Benschoter

(10) Patent No.: US 11,421,754 B2
(45) Date of Patent: Aug. 23, 2022

(54) WEDGE SOCKET SETTING DEVICE

(71) Applicant: Rex Benschoter, Wayne, OH (US)

(72) Inventor: Rex Benschoter, Wayne, OH (US)

( * ) Notice: Subject to any disclaimer, the term of this patent is extended or adjusted under 35 U.S.C. 154(b) by 335 days.

(21) Appl. No.: 16/822,784

(22) Filed: Mar. 18, 2020

(65) Prior Publication Data

US 2020/0300337 A1 Sep. 24, 2020

Related U.S. Application Data

(60) Provisional application No. 62/819,842, filed on Mar. 18, 2019.

(51) Int. Cl.
*F16G 11/04* (2006.01)

(52) U.S. Cl.
CPC .......... *F16G 11/046* (2013.01); *F16G 11/048* (2013.01)

(58) Field of Classification Search
CPC ............................. F16G 11/046; F16G 11/048
See application file for complete search history.

(56) References Cited

U.S. PATENT DOCUMENTS

| | | | | |
|---|---|---|---|---|
| 1,642,243 A | * | 9/1927 | Hinzer | F16G 11/048 174/100 |
| 3,816,012 A | * | 6/1974 | Hubbell | F16G 11/048 403/386 |
| 5,539,961 A | * | 7/1996 | DeFrance | F16G 11/048 403/314 |
| 6,076,236 A | * | 6/2000 | DeFrance | F16G 11/048 294/102.1 |
| 9,039,056 B2 | * | 5/2015 | Whitley | F16G 11/048 294/102.1 |

* cited by examiner

*Primary Examiner* — Robert Sandy
(74) *Attorney, Agent, or Firm* — Zarley Law Firm PLC

(57) ABSTRACT

A wedge socket device having an elongated member with one or more support members. Connected to the elongated member is a bracket adapted to receive a wedge socket and having a pair of vertical stops adapted to receive a cable therebetween. An extension member is slidably and telescopically received within an end of the elongated member. Connected to the elongated matter is a clamping member.

7 Claims, 4 Drawing Sheets

WEDGE SOCKET SETTING DEVICE

CROSS REFERENCE TO RELATED APPLICATION

This application claims the benefit of the priority of U.S. Provisional Application No. 62/819,842 filed on Mar. 18, 2019, the contents of these applications are hereby incorporated by reference in their entirety.

BACKGROUND OF THE INVENTION

An objective of the present invention is to provide a wedge socket setting device that is safer to use and reduces and or eliminates injuries.

Another objective of the present invention is to provide a wedge socket setting device that is easy to use by a single individual.

These and other objectives will be apparent to those having ordinary skill in the art based upon the following written description, drawings and claims.

SUMMARY OF THE INVENTION

A wedge socket setting device has an elongated member having at least one, and preferably two support members. The elongated member has a first end, a second end, top surface, and a bottom surface.

Connected to the top surface of the elongated member is a bracket adapted to receive a wedge socket. The bracket has a pair of vertical supports with a space therebetween adapted to receive a cable.

Slidably and telescopically connected to a second end of the elongated member is an extension member. The extension member has a nut and bolt assembly used to move the extension member toward and away from the elongated member.

Connected to the extension member is a clamping assembly. The clamping assembly have a top member and a bottom member have facing channels that form a bore adapted to receive the cable.

DETAILED DESCRIPTION OF THE PREFERRED EMBODIMENTS

Figure 1:
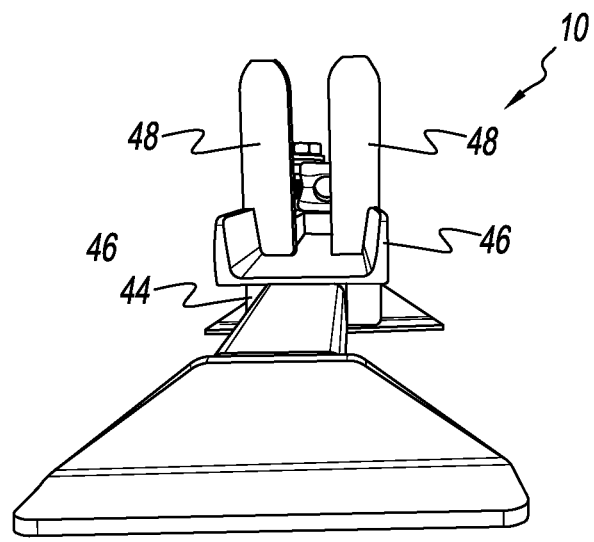
FIG. 1 is an end perspective view of a wedge setting device.
Figure 2:
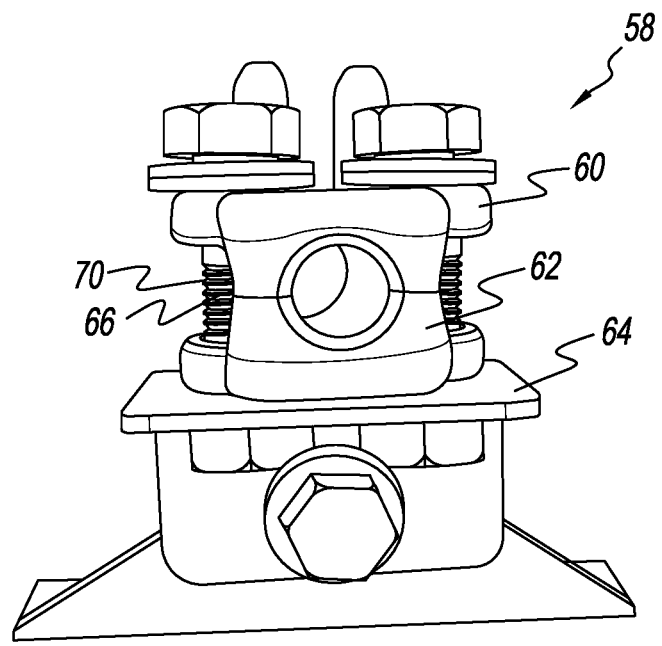
FIG. 2 is an end perspective view of a wedge setting device.
Figure 3:
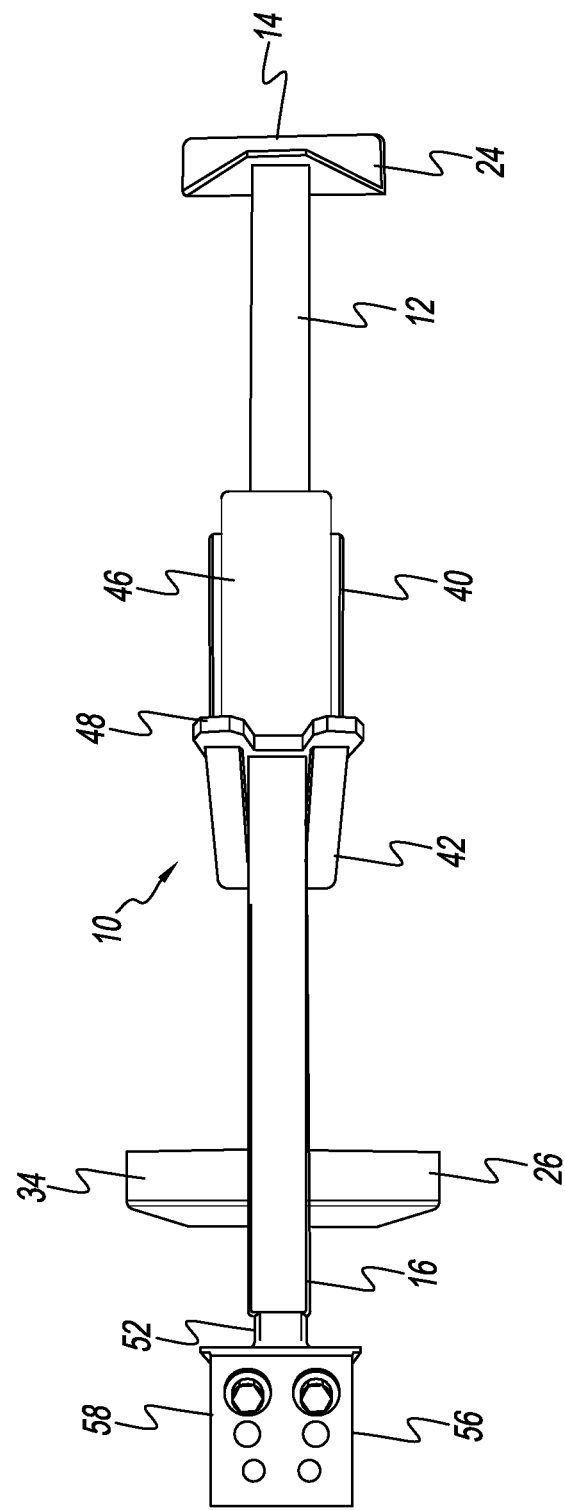
FIG. 3 is a side perspective view of a wedge setting device.
Figure 4:
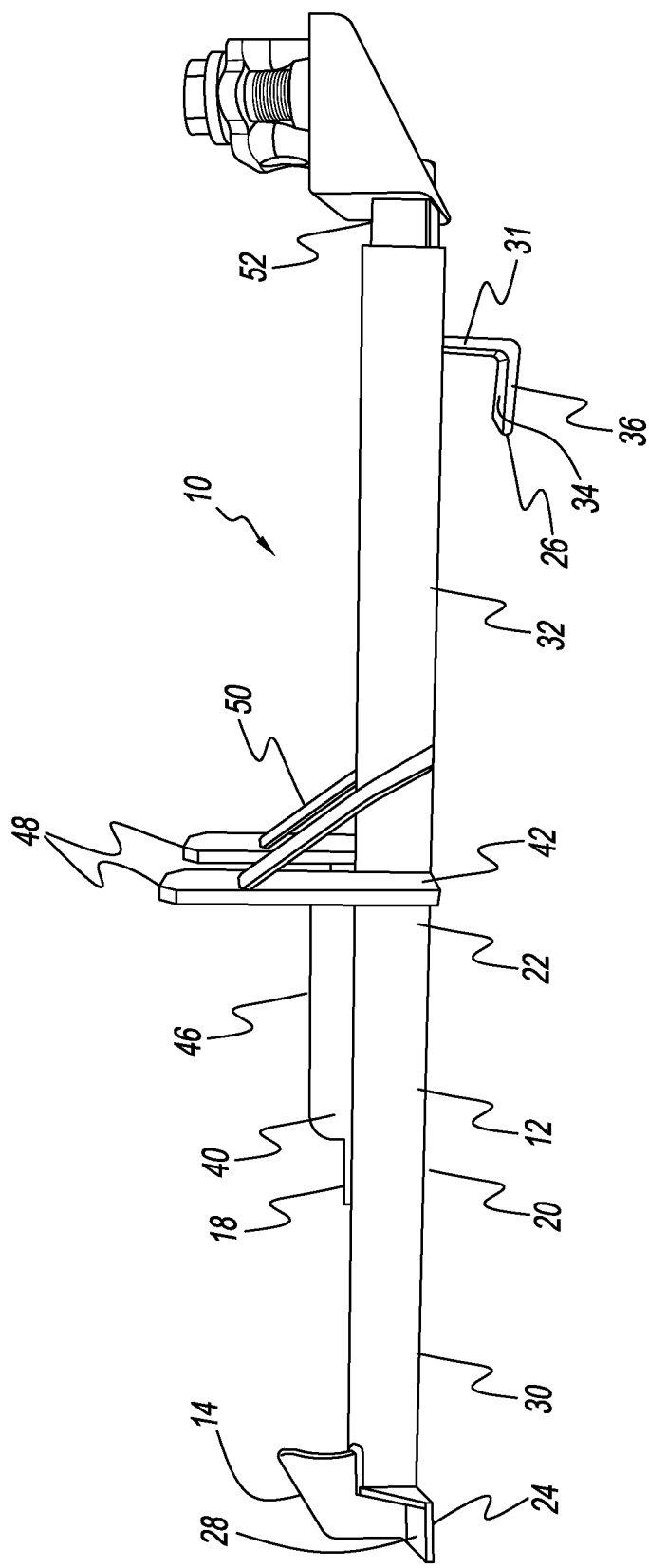
FIG. 4 is a top plan view of a wedge setting device.
Figure 5:
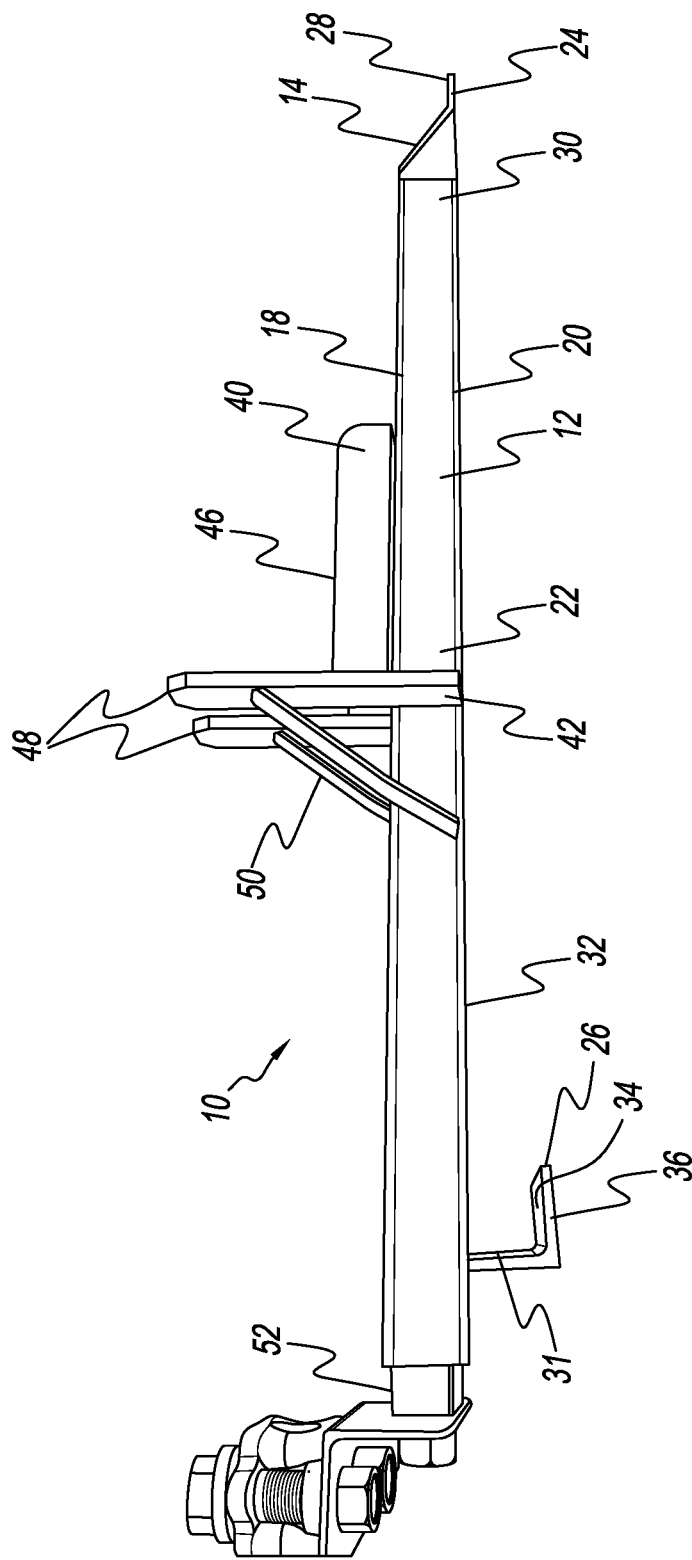
FIG. 5 is a top plan view of a wedge setting device.

Referring to the Figures, a wedge setting device 10 has a hollow elongated member or tube 12. The elongated member 12 has a first end 14, a second end 16, a top surface 18, a bottom surface 20, and sides 22. Attached to the bottom surface 20, at both the first end 14 and the second end 16 are support members 24 and 26 that extend transversely in relation to the elongated member 12.

The first support member 24 has a horizontal flat plate 28 that is attached to the bottom surface 20 of the elongated member 12 and engages the ground surface, and a vertical brace 30 attached to the first end 14 of the elongated member 12 and the top of the horizontal plate 28. The second support member 26 has a vertical member 31 attached to the bottom surface 20 of the elongated member 12 at a top edge 32 and a horizontal member 34 that engages the ground at a bottom edge 36. The vertical member 31 causes the elongated member 12 to angle upwardly as it extends from the first end 14 to the second end 16.

Mounted to top surface 18 of the elongated member 12 is a bracket 38 for holding a wedge socket assembly (not shown). The bracket is of any size, shape, and structure. In the example shown, the bracket 38 has a first end 40 and a second end 42. Extending from the first end 40 to the second end 42 is a flat horizontal wall 44 that is attached to the top surface 18 of elongated member 12 and is wider than the elongated member 12. Extending upwardly and perpendicularly from wall 44 at the outer side edges are a pair of vertical walls 46.

At the second end 42 of bracket 38 are a pair of spaced vertical stops 48. The vertical stops 48 extend upwardly and perpendicularly in relation to the bottom wall 44 and have a height greater than the side vertical walls 46. The vertical stops 48 are supported by a pair of braces 50 that extend from the vertical stops 48 and are connected to the sides 22 of the elongated member 12.

Slidably and telescopically received within the elongated member 12 is an extension member 52. The extension member 52 is moveably connected to the elongated member 12 with a nut and bolt assembly 53 as is well-known to those having ordinary skill in the art. On a top surface 54 of the extension member 52, at an outer end 56 is a clamp assembly 58. In the example shown, the clamp assembly 58 includes a top member 60 and a bottom member 62 that is attached to a support plate 64. The support plate 64 is attached to the top surface 54 of the extension member 52.

The top member 60 and bottom member 62 each have facing channels that when aligned form a bore 66 adapted to receive a cable, wire, or the like. The top member 60, the bottom member 62, and the support plate 64 have vertically aligned threaded holes 68 adapted to receive threaded bolts 70 for tightening the clamp assembly 58.

In operation, to set a wedge, the extension member 52 is in a retracted position where the clamp assembly 58 is adjacent the second end 16 of the elongated member 12. A wedge socket (not shown) is placed in the bracket 38 between the side vertical walls 46. A cable (not shown) is threaded through bore 66 of the clamp assembly 58, through the space between the stops 48 and then through the socket. The cable is looped and then threaded back through the socket and the space between the stops 48.

A wedge is then placed within the loop and inserted within the socket and a clamp is attached to the tail of the cable which engages the stops 48 to prevent the tail from moving back through the space between the stops 48. The clamp assembly 58 is then tightened to hold the cable in place by tightening the threaded bolts 70 placing force from the top member 60 and bottom member 62 against the cable to prevent movement. Using a cordless impact tool at the outer end 56 of the extension member 52, the nut and bolt assembly 53 is rotated causing the extension member 52 to move outwardly away from the elongated member 12.

As the extension member 52 moves outwardly, so does the cable which takes up any slack and then applies force against the wedge and pull the wedge further into the socket to set the wedge in a proper position for use.

To remove the wedge, the extension member 52, using an impact tool, is moved back toward the elongated member 12 so that the end of the wedge that extends through the socket is moved back past the stops 48. A block is then placed between the end of the wedge and the stops 48. The extension member 52 is then moved away from the elongated member 12 as the extension member 52 moves away, force from the block is applied to the wedge causing the wedge to move out of the socket.

From the above discussion and accompanying figures and claims it will be appreciated that a wedge setting device 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A wedge socket setting device, comprising:
   an elongated member having a pair of support members;
   a bracket connected to the elongated member and adapted to receive a wedge socket;
   an extension member slidably connected to an end of the elongated member; and
   a clamp assembly mounted to the extension member.

2. The device of claim 1 wherein the extension member is telescopically received within the end of the elongated member.

3. The device of claim 1 wherein the clamp assembly has a bore adapted to receive a cable.

4. The device of claim 1 wherein the bracket has a pair of spaced vertical stops adapted to receive a cable therebetween.

5. The device of claim 3 wherein the clamp assembly has a top member and a bottom member having facing channels that form the bore.

6. The device of claim 5 wherein the top member, the bottom member, and a support plate have vertically aligned threaded holes adapted to receive threaded bolts for selectively tightening the clamp assembly.

7. The device of claim 1 wherein the extension member has a nut and bolt assembly adapted to cause the extension member to move toward and away from the elongated member when rotated.

\* \* \* \* \*